(12) United States Patent
Portegies Zwart et al.

(10) Patent No.: US 9,382,636 B2
(45) Date of Patent: *Jul. 5, 2016

(54) PROCESS FOR PRODUCING AN IRON-TIN LAYER ON A PACKAGING STEEL SUBSTRATE

(75) Inventors: Ilja Portegies Zwart, Wormer (NL); Jacques Hubert Olga Joseph Wijenberg, Amsterdam (NL)

(73) Assignee: TATA STEEL IJMUIDEN BV, Ijmuiden (NL)

( * ) Notice: Subject to any disclaimer, the term of this patent is extended or adjusted under 35 U.S.C. 154(b) by 431 days.

This patent is subject to a terminal disclaimer.

(21) Appl. No.: 13/876,961

(22) PCT Filed: Oct. 5, 2011

(86) PCT No.: PCT/EP2011/067415
§ 371 (c)(1),
(2), (4) Date: Mar. 29, 2013

(87) PCT Pub. No.: WO2012/045791
PCT Pub. Date: Apr. 12, 2012

(65) Prior Publication Data
US 2013/0183542 A1    Jul. 18, 2013

(30) Foreign Application Priority Data
Oct. 6, 2010   (EP) ..................................... 10013351

(51) Int. Cl.
*C25D 5/50* (2006.01)
*C25D 17/00* (2006.01)
(Continued)

(52) U.S. Cl.
CPC ................ *C25D 5/505* (2013.01); *B32B 15/04* (2013.01); *B32B 15/08* (2013.01); *B65G 49/02* (2013.01); *C21D 1/68* (2013.01); *C21D 1/72* (2013.01); *C21D 1/74* (2013.01); *C21D 8/0405* (2013.01); *C21D 8/0478* (2013.01); *C25D 5/48* (2013.01); *C25D 5/10* (2013.01); *C25D 11/02* (2013.01); *C25D 11/38* (2013.01); *Y10T 428/1259* (2015.01); *Y10T 428/12569* (2015.01)

(58) Field of Classification Search
CPC .. C23C 30/00; C23C 30/005; C23C 2222/00; C23C 2222/10; B32B 15/04; B32B 15/08; B32B 15/18; Y10T 428/12569; Y10T 428/1259; Y10T 428/12556; Y10T 428/12583; Y10T 428/12611; Y10T 428/12618; Y10T 428/12708; Y10T 428/12722; Y10T 428/12598; Y10T 428/12972; Y10T 428/12979; Y10T 428/273
See application file for complete search history.

(56) References Cited

U.S. PATENT DOCUMENTS 2,357,126 A    8/1944   Nachtman
3,174,917 A    3/1965   Lesney et al.
(Continued)

FOREIGN PATENT DOCUMENTS

GB    1123189 A    8/1968

OTHER PUBLICATIONS

International Search Report issued Nov. 7, 2011 for PCT/EP2011/067415 to Portegies Zwart et al filed Oct. 5, 2011.

*Primary Examiner* — Michael E La Villa
(74) *Attorney, Agent, or Firm* — Vorys, Sater, Seymour and Pease LLP (57) ABSTRACT

A production process for producing an iron-tin alloy layer on a packaging steel substrate and to a substrate provided with said layer wherein one or both sides of a SR- or DR-blackplate substrate is coated with an iron-tin alloy layer which contains at least 80 weight percent (wt. %) of FeSn (50 at. % tin and 50 at. % iron).

11 Claims, 6 Drawing Sheets

(51) Int. Cl.
*C25D 19/00* (2006.01)
*C25D 21/02* (2006.01)
*B32B 15/04* (2006.01)
*B32B 15/08* (2006.01)
*B65G 49/02* (2006.01)
*C21D 1/68* (2006.01)
*C21D 1/72* (2006.01)
*C21D 1/74* (2006.01)
*C21D 8/04* (2006.01)
*C25D 5/48* (2006.01)
*C25D 5/10* (2006.01)
*C25D 11/02* (2006.01)
*C25D 11/38* (2006.01)

(56) References Cited

U.S. PATENT DOCUMENTS

| | | | |
|---|---|---|---|
| 3,285,790 A | | 11/1966 | Lockwood |
| RE30,573 E | * | 4/1981 | Ichinose et al. ............... 215/230 |
| 4,487,663 A | | 12/1984 | Hara et al. |
| 4,927,472 A | | 5/1990 | Matsushima et al. |
| 6,982,011 B1 | * | 1/2006 | Pfeifenbring et al. ........ 148/518 |
| 2015/0037604 A1 | * | 2/2015 | Penning et al. ............... 428/622 |
| 2015/0044500 A1 | * | 2/2015 | Campaniello et al. ........ 428/626 |
| 2015/0064494 A1 | * | 3/2015 | Wijenberg et al. ............ 428/623 |
| 2015/0079419 A1 | * | 3/2015 | Campaniello et al. ........ 428/622 |

* cited by examiner

PROCESS FOR PRODUCING AN IRON-TIN LAYER ON A PACKAGING STEEL SUBSTRATE

FIELD OF THE INVENTION

The invention relates to a production process for producing an iron-tin alloy layer on a packaging steel substrate and to a substrate provided with said layer.

BACKGROUND OF THE INVENTION

Tin mill products include tinplate, electrolytic chromium coated steel (ECCS, also referred to as tin free steel or TFS), and blackplate, the uncoated steel. Packaging steels are normally provided as tinplate or as TFS, onto which an organic coating can be applied. In the field of packaging steels there is a growing incentive to reduce the amount of tin used for tinplate due to the increasing cost of the raw materials and resource depletion and reduction of the carbon footprint. The production of TFS currently involves the use of hexavalent chromium, which is a hazardous substance that is potentially harmful to the environment and constitutes a risk in terms of worker safety. There is therefore a need to develop alternative metal coatings that are able to replace conventional tinplate and TFS, without the need to resort to the use of hexavalent chromium and minimising, or even eliminating, the use of tin.

Packaging steel is generally provided in single and double reduced tin mill products. Single Reduced (SR) product is cold rolled directly to the finished gauge, then recrystallisation annealed. Recrystallisation is brought about by continuous annealing or batch annealing the cold rolled material. After annealing the material is usually temper rolled, typically applying a thickness reduction of 1-2%, to improve material properties. Double Reduced (DR) product is given a first cold reduction to reach an intermediate gauge, recrystallisation annealed and then given another cold reduction to the final gauge. The resulting DR product is stiffer, harder, and stronger than SR, allowing customers to utilise lighter gauge steel in their application. These uncoated, cold rolled, recrystallisation annealed SR and DR packaging steels are referred to as blackplate.

Tinplate is characterised by its excellent corrosion resistance and weldability. TFS typically excels in adhesion to organic coatings and retention of coating integrity at temperatures exceeding the melting point of tin. Tinplate is supplied within a range of coating weights, normally between 1.0 and 11.2 $g/m^2$, which are usually applied by electrolytic deposition. Electrolytic Chromium Coated Steel (ECCS) or Tin Free Steel (TFS) consists of a blackplate product which has been coated with a metal chromium layer overlaid with a film of chromium oxide, both applied by electrolytic deposition. TFS can also be supplied within a range of coating weights for both the metal and chromium oxide coating, typically ranging between 20-110 and 2-20 $mg/m^2$, respectively. Both tinplate and TFS can be delivered with equal coating specification for both sides of the steel strip, or with different coating weights per side, the latter being referred to as differential coated strip. Alternative metal coatings based on low amounts of tin, to replace conventional tinplate and TFS, should be able to match the characteristic product performance properties required for each substitution.

Reduction of the tin coating weight of conventionally produced tinplate, involving flowmelting of the electrodeposited tin coating, to below approximately 1 $g/m^2$ leads to a deterioration of product performance in terms of corrosion resistance and compression of the welding range. This observation has resulted in alternative product compositions and process routes that are able to retain tinplate product performance, while reducing the tin coating weights applied. Examples include the application of thin nickel coatings (e.g. nickel coating thickness between 10-20 $mg/m^2$) prior to tinplating to ensure retention of corrosion resistance and welding range at tin coating weights below 1 $g/m^2$. However, due to the presence of a layer of passivated, unalloyed, free tin close to the outer surface of the product these materials are unsuitable to replace TFS as the adhesion to organic coatings and retention of coating integrity at temperatures exceeding the melting point of tin is insufficient.

OBJECT OF THE INVENTION

It is an object of the invention to provide a process for producing a coating on a packaging steel substrate, requiring a very low amount of tin, which can be used, potentially in conjunction with an additionally applied conversion layer, as an alternative to TFS.

It is also an object of the invention to provide a process for producing a coating on a packaging steel substrate, requiring a very low amount of tin, which can be used as a sustainable alternative to conventional tinplate.

It is also an object of the invention to provide a substrate that offers good adhesion to organic coatings.

It is also an object of the invention to provide a substrate with improved mechanical properties.

THE INVENTION

In a first aspect of the invention a coated substrate for packaging applications is provided comprising 1. a recrystallisation annealed single reduced steel substrate (SR blackplate) or 2. a double reduced substrate which was subjected to recrystallisation annealing between the first and second cold rolling treatment (DR blackplate), wherein one or both sides of the SR or DR blackplate substrate is coated with an iron-tin alloy layer which contains at least 80 weight percent (wt. %) of FeSn (50 at. % tin and 50 at. % iron) and wherein the iron-tin alloy layer was formed by diffusion annealing an electrodeposited tin layer at a temperature $T_a$ of at least 513° C. for an annealing time $t_a$ sufficient to convert the tin layer into the iron-tin alloy layer, followed by fast cooling in a non-oxidising cooling medium, while keeping the coated substrate in an reducing or inert gas atmosphere prior to cooling, so as to obtain a robust, stable surface oxide.

FeSn is the compound having 50 atomic percent (at. %) tin and 50 at. % iron. It is the intention of the inventors that this iron-tin layer consists substantially or completely of FeSn. The adhesion and corrosion performance of the coated substrate can be enhanced by applying a conversion layer onto the iron-tin alloy outer surface, specifically excluding the use of hexavalent chromium or chromates. This substrate can be used to replace TFS, considering the large similarities in product performance because of its adhesion to organic coatings, corrosion resistance and retention of coating integrity at temperatures exceeding the melting point of tin. The latter is particularly important when applying a polymer coating e.g. by extrusion coating or laminating because the surface temperature of the metal substrate in these processes may very well exceed the melting temperature of tin, which is about 232° C.

U.S. Pat. No. 3,285,790 discloses a process for continuous annealing of tin coated full-hard steel, which has been tin coated in between two cold rolling steps, to offer a more economic route for the production of thin tinplate, with steel gauges in between 0.025-0.22 mm (0.001"-0.0088"). The continuous annealing process described in U.S. Pat. No. 3,285,790 is primarily aimed at achieving recrystallisation of the bulk steel and involves heating the strip to temperatures between 649 and 982° C. (1200 to 1800° F.). These high annealing temperatures do not result in an FeSn layer according to our invention but in a mixed iron-tin alloy layer, which is reported to be very hard and brittle and does not withstand bending well.

In U.S. Pat. No. 3,174,917 the tin layer is provided on a full-hard-substrate. This necessitates the annealing of the steel at a combination of temperature and time adequate to induce recrystallisation. This treatment will therefore obviously affect the properties of the substrate. According to our invention optimal recrystallisation can be combined with optimal diffusion annealing because the recrystallisation annealing and the diffusion annealing are decoupled. This offers the opportunity to select the most suitable recrystallisation annealing conditions for the full-hard substrate (e.g. like batch or continuous annealing, using varying time-temperature profiles) to create the optimum mechanical properties of the bulk steel (called blackplate after annealing), while separately optimising the process conditions for diffusion annealing of the tin coated blackplate substrate to create the optimum iron-tin alloy coating. Furthermore, in contrast to U.S. Pat. No. 3,174,917, our invention enables the manufacturing of DR-type packaging steel products. Following U.S. Pat. No. 3,174,917, the iron-tin alloy coated substrate produced after continuous annealing should be cold rolled a second time to create a product with DR-type properties of the bulk steel. However, the iron-tin alloy coating will crack severely as a result of the large deformation applied during the second cold rolling step, strongly deteriorating the coating performance properties. U.S. Pat. No. 4,487,663 describes the manufacturing of iron-tin alloy coated steel, which specifically requires the use of a cathodic dichromate treatment to form an oxide film onto the iron-tin alloy layer. The use of such a dichromate treatment is specifically excluded in our invention. The inventors have succeeded in creating an alternative metal coating to TFS or tinplate for packaging steels by providing a dense and homogeneous iron-tin alloy layer onto SR or DR blackplate products, irrespective of these being batch or continuous recrystallisation annealed prior to diffusion annealing (see FIG. 4). This iron-tin alloy layer can be made by using less than 1 g/m$^2$ of tin metal. The corrosion resistance of this iron-tin layer is excellent when compared to TFS and to tinplate if the latter is made using a similar initial tin coating weight. Furthermore, the iron-tin alloy coating does not change physically or in terms of chemical composition afterwards when exposed to temperatures between 200 and 600° C., in contrast to conventional tinplate. This is particularly advantageous if the substrate is provided with an additional organic coating which may e.g. be applied by thermal lamination involving substrate temperatures over 200° C. The dry adhesion of organic coatings to the iron-tin alloy coating was found to be excellent. This is attributed to the composition of the very thin mixed iron-tin oxide layer present on the outer surface. This mixed oxide layer was found to be extremely robust in terms of thickness and composition, even after exposure in an accelerated storage test to an environment of high humidity and elevated temperatures. It was even found that after actively removing the natural oxide layer by a cathodic reduction treatment in a sodium carbonate solution, the natural oxide layer spontaneously returns to its state prior to this treatment after only a small amount of time and then remains stable. These results show that it is not required to apply a passivation treatment, for instance by applying a hexavalent chromium based dichromate process, to stop the growth of the mixed oxide layer. To obtain these properties it is essential that the iron-tin alloy predominantly and preferably only consists of FeSn. In contrast to TFS, the coated substrate according to the invention allows heat resistance welding and thus can be used to make three-piece welded cans.

The inventors found that is necessary to diffusion anneal a tin coated blackplate substrate at a temperature ($T_a$) of at least 513° C. to obtain the coating layer according to the invention. The diffusion annealing time ($t_a$) at the diffusion annealing temperature $T_a$ is chosen such that the conversion of the tin layer into the iron-tin layer is obtained. The predominant and preferably sole iron-tin alloy component in the iron-tin layer is FeSn (i.e. 50 atomic percent (at. %) tin and 50 at. % iron). It should be noted that the combination of diffusion annealing time and temperature are interchangeable to a certain extent. A high $T_a$ and a short $t_a$ will result in the formation of the same iron-tin alloy layer than a lower $T_a$ and a longer $t_a$. The minimum $T_a$ of 513° C. is required, because at lower temperatures the desired (50:50) FeSn layer does not form. Also the diffusion annealing does not have to be at a constant temperature, but the temperature profile can also be such that a peak temperature is reached. It is important that the minimum temperature of 513° C. is maintained for a sufficiently long time to achieve the desired amount of FeSn in the iron-tin diffusion layer. So the diffusion annealing may take place at a constant temperature $T_a$ for a certain period of time, or the diffusion annealing may, e.g., involve a peak metal temperature of $T_a$. In this case the diffusion annealing temperature is not constant. It was found to be preferable to use a diffusion annealing temperature $T_a$ of between 513 and 645° C., preferably of between 513 and 625° C. A lower $T_a$ limits the risk of affecting the bulk mechanical properties of the substrate during the diffusion annealing.

It is a significant advantage that the annealing treatment for forming the FeSn-layer is not intended to cause recrystallisation of the steel substrate. In the invention, the substrate has already been subjected to recrystallisation before tinplating. Consequently, the process according to the invention is also applicable to batch-recrystallisation-annealed (BA) blackplate due to the separation of recrystallisation annealing and alloying treatment by diffusion annealing. This makes the process interesting for the production of double-reduced (DR) grades or heavy temper-rolled grades, because there the recrystallisation annealing treatment takes place between the two reductions, and the diffusion annealing takes place only after the tinplating after the second reduction. The SR-substrate has already recrystallised prior to providing the tin-layer on one or both surfaces. The substrate may be the low carbon, extra low carbon or ultra low carbon steel grades conventionally used for tin mill products.

The substrate is not subjected to further extensive reductions in thickness after forming of the FeSn-layer. A further reduction in thickness may cause the FeSn-layer to develop cracks. The reductions as a result of temper rolling (if required) and the reductions subjected to the material during the production of the packaging applications do not cause these cracks to form, or if they form, to adversely affect the performance of the coated substrate. Temper rolling reductions are normally between 0 and 3%.

In a preferred embodiment the iron-tin diffusion layer contains at least 85 wt. % of FeSn, preferably at least 90 wt. %, more preferably at least 95 wt. %. This is the embodiment where the iron-tin alloy is a single phase alloy that consists substantially or completely of FeSn. Obviously, due to fluctuations in processing conditions there may be a slight unintended formation of other compounds of Fe and Sn, but the intention is to achieve as high as possible weight percentage of the single phase FeSn alloy phase in the iron-tin alloy coating layer.

In addition to allowing the surface alloying process by diffusion annealing to take place, this heat treatment also affects the mechanical properties of the bulk steel substrate, which is the result of a combination of material ageing and recovery effects. The impact on the mechanical properties of the bulk steel substrate varies with steel composition, e.g. carbon content of the steel, and mechanical processing history of the material, e.g. amount of cold rolling reduction, batch or continuous annealing. It was found that the microstructure of the steel substrate does not change after a short exposure to the elevated temperatures, i.e. between 513 to 625° C. required for creating the iron-tin surface alloy. In case of low carbon steels (typically 0.05 to 0.15 wt. % C) or extra low carbon steels (typically 0.02 to 0.05 wt. % C) the yield and ultimate strength can be affected, as a result of carbon going into solution. Also, a varying amount of yield point elongation is observed after this heat treatment, for CA and BA carbon steel grades. This yield point elongation effect can be suppressed by temper rolling. Interestingly, the formability of DR steel grades can be significantly enhanced as a result of the heat treatment. This effect is attributed to recovery of the deformed steel, which is normally not annealed after the second cold rolling operation, and which leads to improved elongation values. This recovery effect becomes more pronounced with increasing reduction applied in the second cold-rolling operation.

In an embodiment of the invention the substrate consists of an interstitial-free ultra-low carbon steel, such as a titanium stabilised or titanium-niobium stabilised interstitial-free steel. By using ultra-low carbon, interstitial free (IF) steels, like titanium or titanium niobium stabilised ultra-low carbon steel, the beneficial aspects of the annealing process on mechanical properties, including the recovery effect for DR substrates, of the bulk steel substrate can be retained without the potential drawbacks of carbon or nitrogen ageing. This is attributed to the fact that in case of IF steels all interstitial carbon and nitrogen present in the bulk steel is chemically bonded, preventing it from going into solution during annealing. During diffusion annealing experiments no ageing effects of IF steels were observed.

In an embodiment of the invention the coated substrate is further provided with a conversion coating to reduce the pitting corrosion sensitivity of the material and enhance the adhesion to organic coatings, preferably wherein the coated substrate is first pretreated to increase the surface tension of the outer surface prior to application of a conversion coating.

It was found that the wet adhesion of organic coatings to the iron-tin alloy coating could be further improved by applying a conversion layer on top of the mixed surface oxide. The wet adhesion performance has been determined by e.g. exposing the organic coated material to various sterilisation media, used to simulate processing conditions applied when filling human and pet food into cans. The wet adhesion of both lacquers and thermoplastic polymers, like PET, improved by applying commercially available compounds such as Granodine™ (Henkel) or Oxsilan® (Chemetall) type products when exposing the organic coated samples to sterilisation processing involving acetic acid or cysteine. The wet adhesion also improved after a cathodic treatment of an activated surface in a 10 mM $KCr(SO_4)_2 \times 12H_2O$ electrolyte at 20° C. (pH adjusted to 2.3 by adding sulphuric acid solution), whereby a current density of 2.5 $A/dm^2$ was applied for 5 s. Other embodiments of this conversion treatment are also possible, e.g. using another salt as source for trivalent chromium ions in the electrolyte, a different current density or a different treatment time.

Surprisingly, it was noted that the iron-tin alloy coating according to the invention is also very resistant to sulphur staining. A well-known issue with conventional tinplate is that during sterilisation of food stuffs containing sulphur (like in sterilisation involving cysteine), staining of the surface can occur as a result of the formation of tin-sulphide. Apparently, this iron-tin alloy coating is impervious to sulphur staining, irrespective of the presence of an additional conversion layer, even at elevated sterilisation temperatures of 131° C. as used in pet food processing.

Although the mechanism is not yet fully understood, it is believed that the effect of the pre-treatment is maybe not a passivating effect, but rather a shielding effect and it also leads to a better adhesion.

For the application of a conversion coating dipping, spraying or electrochemically assisted deposition can be used, while some conversion coating chemistries require drying after application. It was found that the homogeneous application of various conversion layers could be improved by pretreating the iron-tin alloy coating to increase the surface tension level of the outer surface. This pretreatment can exist of various methods like dipping in an acidic etching fluid, e.g. like a sulphuric acid solution, followed by rinsing in water, or applying a flame, corona or plasma treatment and the choice of which method to use depends on the type of conversion layer used. The inventors found that an efficient pretreatment consisted of dipping the substrate provided with the iron-tin alloy coating into a sodium carbonate solution for a short time, typically a second, while passing a cathodic current through the substrate at a current density of 0.8 $A/dm^2$.

An additional benefit of applying a conversion layer on top of the iron-tin alloy is that it suppresses pitting corrosion and cathodic delamination.

In another preferred embodiment of the invention there is provided a coated substrate for packaging applications wherein the coated substrate is further provided with an organic coating, consisting of either a thermoset (i.e. lacquer) or thermoplastic single or multi-layer polymer coating. The high melting point of the iron-tin alloy makes the coated substrate extremely suitable for coating with a polymer layer, either by direct extrusion, extrusion followed by lamination or film lamination as the temperature required for the polymer to adhere to the substrate may easily exceed the melting temperature of a conventional tin layer, such as when applying PET in a conventional process. This is a clear advantage of the coated substrate according to the invention.

In a preferred embodiment of the invention the coated substrate is provided with a second tin layer, which is optionally reflowed, and to which an hexavalent-chromium-free passivation treatment is optionally applied. An additional tin layer is applied on top of the alloy layer, preferably by electrodeposition, which can be subsequently flowmelted, and to which a passivation treatment is applied, specifically excluding the use of hexavalent chromium or chromates, in order to prevent further oxidation of the tin surface. This substrate can be used as a more sustainable substitute for conventional tinplate as it requires significantly less tin to achieve a similar product performance, and excludes the use of hexavalent chromium or chromates.

In a preferred embodiment of the invention the initial tin coating weight, prior to annealing to form the iron-tin alloy layer is at most 1000 mg/m$^2$, preferably between 100 and 600 mg/m$^2$ of substrate. This is at least a factor 3 lower than conventional tinplate and therefore results in significant savings both in electricity (carbon emissions!) and tin use.

In a preferred embodiment of the invention a coated substrate for packaging applications is provided wherein the thermoplastic polymer coating is a polymer coating system comprising one or more layers preferably comprising polyester, polyolefin, polyimide, or copolymers thereof, or blends thereof. Achieving excellent adhesion of the thermoplastic coating to the steel substrate is very important to obtain a good can performance, e.g. like good resistance to corrosion. Until now, ECCS has been the substrate of choice for use with thermoplastics coatings due to its unrivalled adhesion properties. However, as mentioned earlier, the issue with ECCS is the required use of hexavalent chromium for its production. Despite significant research efforts no alternative production route has yet been found that has led to an economically, technically and environmentally adequate alternative solution. The iron-tin diffusion layer according to the invention does provide excellent adhesion to polymer coatings without any treatment involving the aforementioned dangerous chemicals.

In a preferred embodiment of the invention a coated substrate for packaging applications is provided wherein thermoplastic polymer coating is a polymer coating system comprising one or more layers comprising polyester such as PET and/or PBT or, polyolefins such as PE or PP, or copolymers thereof, or blends thereof. The use of these known polymer coating systems onto the new substrate provides an excellent combination of properties. The fact that the melting point of the iron-tin alloy layer is very high results in easy processing at the elevated temperatures necessary for laminating some of the polymer systems such as polyimides and polyesters.

In a preferred embodiment of the invention a coated substrate for packaging applications is provided wherein both sides of the steel substrate are coated with an iron-tin diffusion layer. The substrate can also be applied on two sides of the packaging, i.e. the side becoming the inside of the packaging and the outside are both provided with the iron-tin alloy layer. This means that the amount of tin on both sides can be minimised, and the protection against corrosion or aesthetic deterioration of the outside of the packaging is prevented by the good corrosion properties of the iron-tin layer optionally also provided with an organic topcoat such as a polymer coating layer or a lacquer. The iron-tin alloy layer may also be part of the coating system(s) on a differential coated strip.

In a second aspect a process for producing a coated substrate for packaging applications by producing an iron-tin alloy layer on a blackplate steel substrate comprising the steps of:
Providing a SR or a DR blackplate steel substrate suitable for electrolytic tinplating;
Providing a first tin layer onto one or both sides of the blackplate steel substrate in a first electroplating step, preferably wherein the tin coating weight is at most 1000 mg/m$^2$, preferably between 100 and 600 mg/m$^2$ of substrate surface;
Diffusion annealing the blackplate substrate provided with said tin layer in a reducing gas atmosphere to an annealing temperature ($T_a$) of at least 513 for a time sufficient to convert the first tin layer into an iron-tin alloy layer or layers to obtain an iron-tin alloy layer which contains at least 80 weight percent (wt. %) of FeSn (50 at. % tin and 50 at. % iron);
Rapidly cooling the substrate with the iron-tin alloy layer(s) in an inert, non-oxidising cooling medium, while keeping the coated substrate in a reducing or inert gas atmosphere prior to cooling, so as to obtain a robust, stable surface oxide.

The process according to the invention can be incorporated in a modified standard tinplating line. The temperature $T_a$ of at least 513° C. ensures that the iron-tin alloy phase is formed rapidly. The amount of tin needed on each surface for forming a dense and closed iron-tin alloy layer is preferably at most 1000 mg/m$^2$ and the inventors found that it is preferable to use between 100 and 600 mg/m$^2$ of substrate surface. It was found to be preferable to use a diffusion annealing temperature $T_a$ of between 513 and 645° C., preferably of between 513 and 625° C. A lower $T_a$ limits the risk of affecting the bulk mechanical properties of the substrate during the diffusion annealing.

In a preferred embodiment a process for producing a coated substrate for packaging applications is provided wherein the iron to tin ratio in the iron-tin alloy is about 1. As described hereinabove, the formation of FeSn in a ratio of 1:1 in at. % is preferable, because it results in a dense and closed layer, which is crack-free, resistant to deformation, and provides excellent adhesion.

In a preferred embodiment a process for producing a coated substrate for packaging applications is provided wherein the diffusion annealing is performed immediately upon finishing the first tinplating step, and/or wherein the diffusion annealing comprises a very rapid heating of above 300° C./s in a hydrogen containing atmosphere, such as HNX, to a temperature between 550 and 625° C., and/or wherein the diffusion annealing is followed by rapid cooling at a cooling rate of at least 100° C./s, and/or wherein the cooling is preferably performed in a reducing or inert atmosphere, such as a helium, nitrogen or HNX atmosphere. Hybrid cooling such as initial cooling with nitrogen, for instance from the top temperature to 300° C. followed by a water quench also provided a good surface quality. It was found that cooling in air led to extensive and undesirable oxide growth onto the FeSn-layer leading to bad adhesion properties.

In an embodiment of the invention the rapid cooling is achieved by means of water quenching, wherein the water for quenching has a temperature between room temperature and its boiling temperature, preferably wherein the water used for quenching has a temperature between 80° C. and the boiling temperature, preferably between 85° C. and the boiling temperature. The dissolved oxygen content in the water should be as low as possible.

In an embodiment of the invention a process is provided wherein:
- the diffusion annealing is performed immediately upon finishing the first tinplating step, and/or
- the diffusion annealing process utilises a heating rate preferably exceeding 300° C./s, preferably in a hydrogen containing atmosphere, such as HNX containing 5 wt. % hydrogen, preferably to a temperature between 550 and 625° C., and/or
- the diffusion annealing is directly followed by rapid cooling at a cooling rate of at least 100° C./s, preferably of at least 300° C./s, and/or
- the cooling is preferably performed in a reducing or inert medium, such as a HNX or nitrogen atmosphere and/or
- the cooling is preferably performed applying a hot water quench, with a water temperature of 85° C., while keeping the substrate with the iron-tin alloy layer(s) shielded from oxygen by maintaining an inert or reducing gas atmosphere, such as HNX gas, prior to quenching.

It was found that cooling in air led to extensive and undesirable oxide growth on top of the FeSn alloy layer leading to bad adhesion properties. In addition, it was found that cooling in air followed by quenching in water did not only lead to extensive formation of surface oxides, but also caused the material to deform through formation of so-called cooling buckles. Hybrid cooling such as initial cooling with nitrogen gas, for instance from the annealing temperature to 300° C. followed by a water quench to reach ambient temperatures also provided good results by providing a FeSn alloy layer with a small amount of surface oxides. The inventors found that a very efficient cooling method is to quench the heated and coated substrate directly after diffusion annealing in a water bath while ensuring that the substrate does not come into contact with oxygen prior to quenching, for instance by keeping the substrate in an inert or reducing gas atmosphere prior to quenching in water. It is important that the water contains as low as possible a dissolved oxygen content to avoid oxidation of the surface. It was found by the inventors that it is beneficial to use water with an elevated temperature for quenching the coated substrate. If the temperature of the water is too low, like at room temperature, the cooling of the substrate apparently becomes inhomogeneous, leading to buckling of the substrate. By using elevated water temperatures, e.g. 80 or 85° C., buckling of the substrate due to uneven cooling can be prevented. It was found that this process concept enables cooling the hot substrate at very high cooling rates exceeding 300 or 350° C./s, without negatively affecting the surface oxide properties or substrate shape. Another option is to apply forced convection methods during quenching, like using an optimised array of spray nozzles directed at the strip surface, to spray cooling water onto to strip to achieve a more homogeneous cooling rate over the strip surface. This method allows the use of lower water temperatures, without increasing the risk of buckling of the strip. Preferably the water temperature in this option is below 80° C., more preferably between 30 and 70° C. Another option is to employ indirect cooling by using cooling rolls. This method has the advantage of preventing direct contact of the cooling medium with the strip, which clearly simplifies the issue of having to maintain a non-oxidising gas atmosphere while cooling the substrate. In a preferable embodiment, the maximum annealing temperature is limited to 615° C. The inventors found the highest FeSn content in the iron-tin alloy layer for annealing temperatures ranging from 550° C. to just above 600° C.

In a preferred embodiment a process for producing a coated substrate for packaging is provided wherein the time at $T_a$ is at most 4 seconds, preferably at most 2 seconds, and more preferably wherein there is no dwell time at $T_a$. In the latter case the diffusion annealing takes place by heating the substrate to the peak metal temperature of $T_a$ after which the substrate is cooled. The short dwell time at $T_a$ allows the production of the iron-tin alloy layer in an appropriately modified conventional tinplating line and, in addition, the risk of adversely affecting the bulk mechanical properties of the substrate is minimised.

In an embodiment a process for producing a coated substrate for packaging applications is provided wherein the iron-tin alloy layer is coated with a second tin layer in a second tinplating step on one or both sides of the substrate, optionally followed by a flowmelting step and/or a passivation treatment of the said second tin layer. This process produces an almost conventional tinplate product but with a significantly lower tin weight per unity of surface. The optional passivation treatment is a hexavalent-chromium-free passivation treatment.

The application of an additional tin layer on top of the iron-tin alloy can be realised by a second tinplating step, preceded by dipping the iron-tin alloy coated strip in an acidic solution, e.g. like a sulphuric acid solution, to activate the surface prior to electrodeposition. The resulting product can be used directly for canmaking, but requires application of a passivation treatment to prevent excessive growth of tin oxides on the surface. As mentioned previously, for this purpose, hexavalent-chromium-free passivation treatments can be applied. In fact, alternative passivations used for conventional tinplate can also be used in combination with the low tin products based on using the iron-tin alloy coatings with an iron content of 50 at. %. Instead of directly applying a passivation treatment, the second tin metal layer can also be flowmelted, applying standard processing methods used for conventional tinplate, e.g. application of a flux and subsequent flowmelting, using either electrical resistance heating or induction heating. After flowmelting the surface needs to be passivated as described earlier.

In a preferred embodiment a process for producing a coated substrate for packaging applications is provided wherein the iron-tin alloy layer or both iron-tin alloy layers is/are coated with a conversion layer and/or wherein the coated substrate is provided with an organic coating, consisting of either a thermoset (i.e. lacquer) or thermoplastic single or multi-layer polymer coating.

It was found that under certain circumstances it is advantageous to pre-treat the iron-tin diffusion layer prior to applying the polymer coating layer as described above. It is believed that the effect of the pre-treatment is maybe not a passivating effect, but rather a shielding effect and it also leads to a better adhesion. It is to be noted again that the production of the product and the process according to the invention is achieved without chromate compounds or chromating treatments at any stage.

In an embodiment of the invention the diffusion annealing treatment for forming the iron-tin alloying layer is adapted to promote ageing in the SR substrate or DR substrate and/or recovery of the DR substrate.

In a third aspect an apparatus for producing a strip of coated substrate for packaging applications by producing an iron-tin alloy layer on a packaging steel substrate comprising:
- One or more tinplating cells for providing the strip with a first tin layer onto one or both sides, optionally followed by one or more rinsing tanks for removing excess electrolyte;
- Followed by a heating section for diffusion annealing the first tin layer at a temperature $T_a$ for an annealing time $t_a$ sufficient to convert the first tin layer into an iron-tin alloy layer or layers followed by a fast cooling section, preferably wherein the heating rate of the heating section is at least 300° C./s, and/or wherein the atmosphere in the heating section is a hydrogen containing atmosphere, such as HNX;

Optionally followed by one or more further tinplating cells, the further tinplating cells optionally being preceded by a pretreatment section to activate the iron-tin alloy surface, for providing the strip with a second tin layer onto one or both sides, optionally followed by one or more rinsing tanks for removing excess electrolyte;

Optionally followed by a melting section for fluxing and flowmelting the second tin layer;

Followed by fast cooling wherein the cooling rate after heating is preferably at least 100° C./s;

Optionally followed by a passivation section, e.g. to apply a hexavalent-chromium-free passivation layer.

It should be noted that the described processes are very compact and can be fitted relatively easily into existing electrolytic tinplating lines, offering significant advantages in terms of ease of construction and costs.

It is to be noted that the production of the product and the process according to the invention do not involve chromate compounds or chromating treatments such as chromate passivation at any stage.

In a preferred embodiment a process for producing a coated substrate for packaging applications is provided wherein the heating treatment for forming the diffusion layer is adapted to promote ageing in the SR substrate or DR substrate and/or recovery of the DR substrate. It was found that the ageing treatment could be tuned (temperature, annealing atmosphere and annealing time being the main parameters) such that a significant increase in yield strength is obtained in SR-substrates. The assessment of the magnitude of these effects and the choice of the relevant parameters is well within the scope of the abilities of the skilled person.

Figure 4:
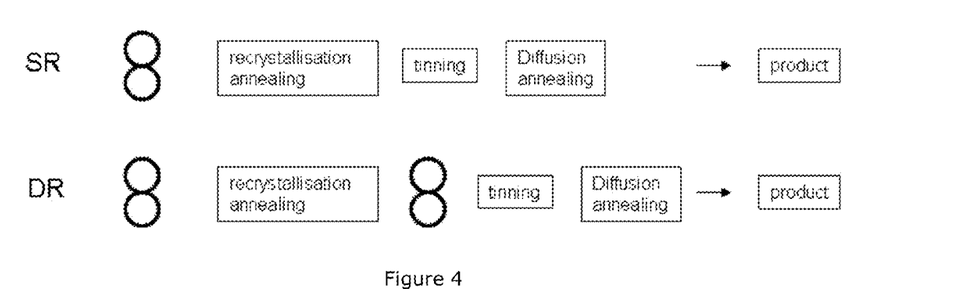
FIG. 4 is a diagrammatic view of the processing steps for SR and DR.

To explain the difference between the SR and DR route reference is made to FIG. 4 wherein the SR route is shown in comparison to the DR route. It is important to note that according to the invention the recrystallisation annealing takes place before the tinning in the SR-route and before the second cold deformation step in the DR-route. The cold rolling steps are presented in the figure by the two circles on top of each other and represent a rolling treatment. The SR-route has only one cold-rolling step which may consist of multiple deformations (typically 4 or 5 rolling stands) and the DR-route has two cold-rolling steps which individually may consist of multiple deformations. After tinning the tinplate is subjected to the diffusion annealing to produce the FeSn iron-tin alloy layer. The product which is then obtained can be provided with a second tin-layer and optionally reflown, and/or provided with a conversion coating, passivation or an organic coating. The so-called temper rolling step of the SR-substrate (i.e after recrystallisation annealing and before tinning) is not shown in FIG. 4.

EXAMPLES

Packaging steel sheet samples (grade TH 340) were cleaned thoroughly in a commercial alkaline cleaner (Chela Clean KC-25 supplied by Foster Chemicals), rinsed in DI water, pickled in a 50 g/l sulphuric acid solution at room temperature for 5 s, and rinsed again. Then, the samples were plated with a tin coating of 600 mg/m$^2$ from a MSA bath that is commonly used for the production of tinplate in a continuous strip plating line. A current density of 10 A/dm$^2$ was applied for 1 s.

After tin plating, the samples were annealed in a reducing gas atmosphere, using HNX containing 5% $H_2(g)$. The samples were heated from room temperature to 600° C. with a heating rate of 100° C./s. Immediately after the sample had reached its peak temperature of 600° C., one sample was cooled down by means of intense blowing with helium gas and another sample was cooled down by means of a water quench. When the sample is quenched in cold water, many dents are formed in the sample, a phenomenon known as 'cooling buckling'. However, when the water in the quench tank is heated to 80° C. or higher, cooling buckling no longer occurs. In case of cooling with helium gas, the cooling rate was 100° C./s. Cooling by means of the hot water quench goes much faster. In about 1 second the sample is cooled down from 600° C. to 80° C., being the temperature of the water in the quench tank.

Figure 1:
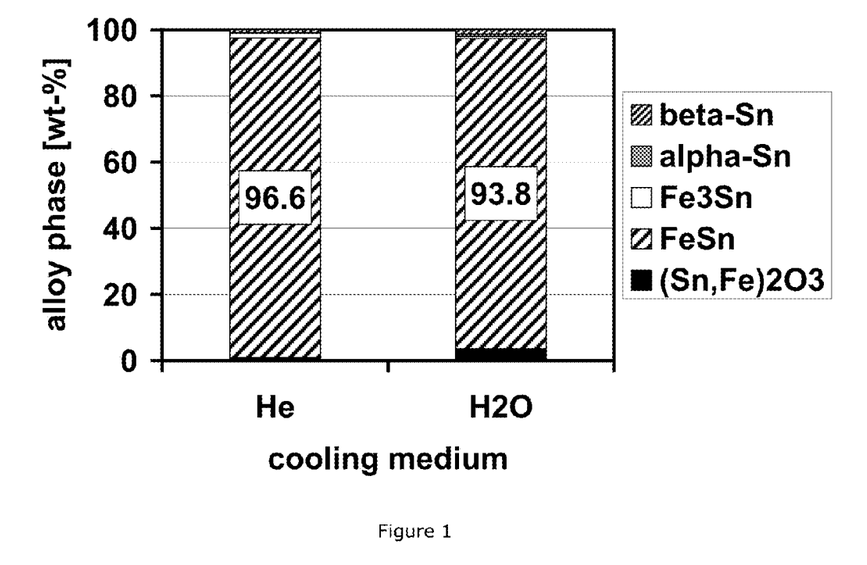
FIG. 1 shows the phases formed during diffusion annealing by illustrating a graph of alloy phase verses cooling medium.

The phases, which are formed during this diffusion annealing step, were analysed by means of X-Ray Diffraction (see FIG. 1 which shows the alloy phases formed by diffusion annealing at $T_a$ of 600° C. and the effect of the cooling rate after the annealing). In both cases, an iron-tin alloy layer is formed which contains more than 90% of the desired FeSn alloy phase (96.6 and 93.8 respectively). Other examples showed values of 85.0 to 97.8% FeSn for annealing temperatures from 550 to 625° C., wherein annealing at annealing temperatures of above 550 and below 615° C. resulted in a range between 92.2% to 97.8%.

Figure 2:
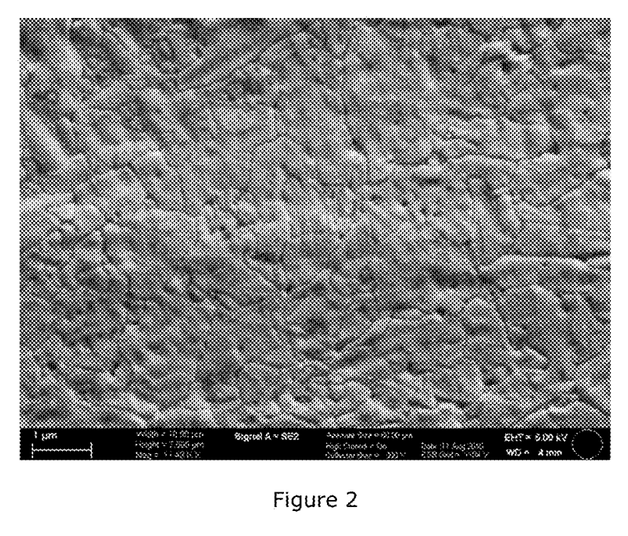
FIG. 2 shows the SEM SE image of the sample cooled with helium gas.
Figure 3:
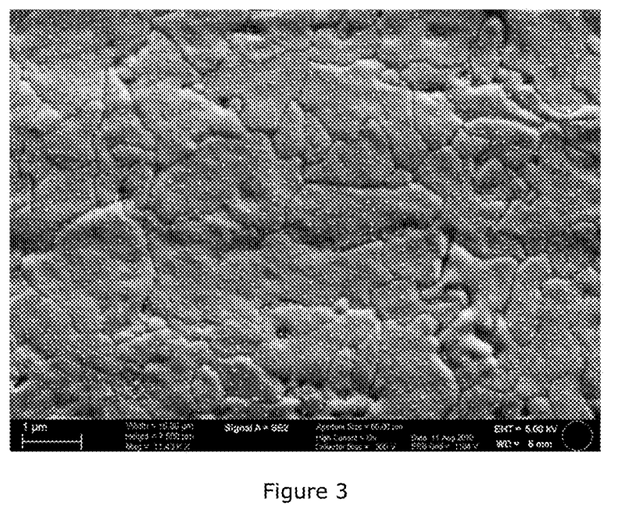
FIG. 3 shows the SEM SE image of the sample cooled with helium gas and water.

The morphology of the coating was analysed with Scanning Electron Microscopy. SE (Secondary Electron) images of both samples described above are given in FIGS. 2 and 3 which show the SEM SE image of the sample cooled with helium gas (FIG. 2) and with water (FIG. 3). In both cases, a very dense and compact structure is formed, which is typical for the FeSn alloy phase. On top of the water cooled sample, also very tiny triangular crystallites are formed.

Figure 5:
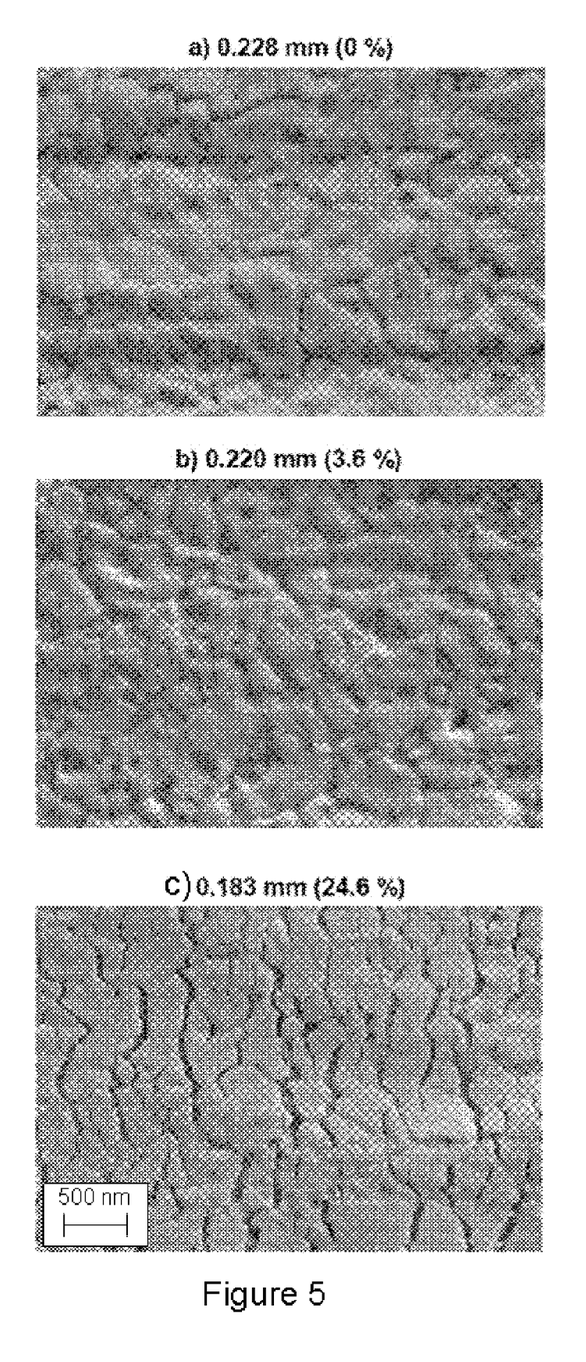
FIG. 5a shows the SEM SE image of the FeSn layer.
FIG. 5b shows the SEM SE image of the effect of a temper rolling reduction of the FeSn layer.
FIG. 5c shows the SEM SE image of the effect of a large cold rolling deformation of the FeSn layer.

FIG. 5 shows the effect of a temper rolling reduction (FIG. 5b) and a large cold rolling deformation (FIG. 5c) on the formation of cracks in the FeSn layer, illustrating why in a process of producing a DR-product the FeSn layer should be formed after the second cold rolling step as illustrated in FIG. 4. An FeSn layer formed between the two rolling steps would be subjected to too high a deformation and crack. Temper rolling reductions do not result in cracking (see FIG. 5b).

Figure 6:
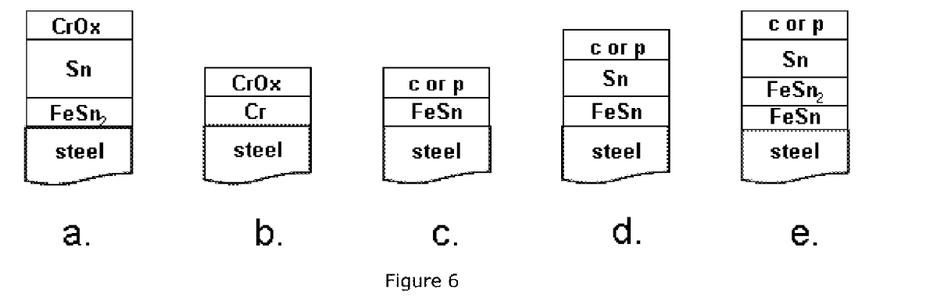
FIG. 6 shows a schematic representation of the coating system produced according to the invention.

FIG. 6 shows a schematic representation of the coating system produced according to the invention. FIG. 6a shows the known tinplate which is remelted and passivated with a chromate (Cr(VI)-treatment) and FIG. 6b known ECCS substrate (TFS).

FIG. 6c to e are embodiments of the invention. Figure c shows an FeSn alloy on the substrate. The tin layer is completely converted into an FeSn iron-tin alloy layer and a conversion and/or passivation layer (indicated with "(c or p)" in FIGS. 6c-6e) is provided on top. FIG. 6d shows a steel substrate provided with an FeSn alloy between the second tin-layer and the substrate, the outer tin layer being applied with a conversion and/or passivation layer. FIG. 6e shows a tinplate where the second tin layer is remelted and subsequently passivated. The conversion and/or passivation treatments are hexavalent chromium free processes.

The invention claimed is:

1. A process for producing a coated substrate for packaging applications by producing an iron-tin alloy layer on a SR- or DR-blackplate steel substrate, the process comprising the steps of:

providing a black plate steel substrate selected from the group consisting of
- a recrystallisation annealed SR blackplate composed of single reduced steel substrate, or
- a DR blackplate composed of double reduced steel substrate which was subjected to recrystallisation annealing between the first and second cold rolling treatment;

providing a first tin coating layer onto one or both sides of the blackplate steel substrate in a first electroplating step;

diffusion annealing the blackplate substrate provided with said first tin coating layer in a reducing gas atmosphere to an annealing temperature $T_a$ of at least 513° C. for a time $t_a$ sufficient to convert the at least the first tin coating layer into an iron-tin alloy layer to obtain an iron-tin alloy layer which contains at least 80 weight percent (wt. %) of FeSn which consists of 50 at. % tin and 50 at. % iron;

rapidly cooling the substrate with the iron-tin alloy layer in an inert, non-oxidising cooling medium, while keeping the coated substrate in a reducing or inert gas atmosphere prior to cooling, so as to obtain a robust, stable surface oxide.

2. The process for producing a coated substrate for packaging applications according to claim 1, wherein the FeSn coating of the coated substrate is further provided with a thermoplastic polymer coating, wherein the thermoplastic polymer coating is a polymer coating system comprising one or more layers of polymer selected from the group consisting of
a) a polyester selected from the group consisting of polyethylene terephthalate polyester and polybutylene terephthalate polyester;
b) a polyolefin selected from the group consisting of polyethylene and polypropylene;
c) a copolymer of at least any two members selected from the group consisting of ethylene terephthalate, butylene terephthalate, ethylene, and propylene; and
d) blends of at least two members selected from the group consisting of polyethylene terephthalate polyester, polybutylene terephthalate polyester, polyethylene, polypropylene, and copolymers of item c).

3. The process for producing a coated substrate for packaging applications according to claim 1, wherein the iron-tin alloy layer contains at least 85 wt. % of FeSn.

4. The process for producing a coated substrate for packaging applications according to claim 1, wherein the rapid cooling is achieved by means of water quenching, wherein the water for quenching has a temperature between room temperature and its boiling temperature.

5. The process for producing a coated substrate for packaging applications according to claim 1, wherein
the diffusion annealing process is performed immediately upon finishing the first tin plating step, and/or
the diffusion annealing is directly followed by rapid cooling at a cooling rate of at least 100° C./s.

6. The process for producing a coated substrate for packaging applications according to claim 1, wherein the time at $T_a$ is at most 4 seconds.

7. The process for producing a coated substrate for packaging applications according to claim 1, wherein the iron-tin alloy layer on at least one side of the substrate is coated with a second tin layer in a second tin plating step prior to forming the oxide, optionally followed by a flow melting step and/or a passivation treatment.

8. The process for producing a coated substrate for packaging applications according to claim 1, wherein the iron-tin alloy layer on at least one side of the substrate is coated with at least one of a conversion layer, an organic coating and combinations thereof, wherein the organic coating comprises at least one selected from the group consisting of a thermoset lacquer, a thermoplastic single layer polymer coating, and a thermoplastic multi-layer polymer coating.

9. The process for producing a coated substrate for packaging applications according to claim 1, wherein the annealing treatment for forming the iron-tin alloy layer is adapted to promote ageing in the SR substrate or DR substrate and/or recovery of the DR substrate.

10. The process for producing a coated substrate for packaging applications according to claim 1, wherein
the diffusion annealing process is performed immediately upon finishing the first tin plating step, and/or
the diffusion annealing process utilises a heating rate exceeding 300° C./s in a hydrogen containing atmosphere, to a temperature between 513 and 625° C., and/or
the diffusion annealing is directly followed by rapid cooling at a cooling rate of at least 100° C./s, and
wherein the cooling is at least one selected from the group consisting of
a) performed in a reducing atmosphere comprising nitrogen atmosphere, and
b) performed by applying a hot water quench, with a minimal dissolved oxygen content, and with a water temperature of 85° C., while keeping the substrate with the iron-tin alloy layer(s) shielded from oxygen by maintaining an inert or reducing gas atmosphere, prior to quenching.

11. An apparatus for producing the strip of coated substrate for packaging applications by producing the iron-tin alloy layer on the packaging steel substrate according to the process of claim 1, comprising:
at least one tin plating cell for providing the strip with the first tin layer onto one or both sides, optionally followed by one or more rinsing tanks for removing excess electrolyte;
followed by a heating section for diffusion annealing the first tin layer at a temperature $T_a$ of at least 513° C. for a annealing time $t_a$ sufficient to convert the first tin layer into the iron-tin alloy layer followed by a fast cooling section comprising a non-oxidising cooling medium, and wherein the heating rate of the heating section is at least 300° C./s wherein the atmosphere in the heating section optionally is a hydrogen containing atmosphere;
optionally followed by at least one further tin plating cell, the further tin plating cell optionally being preceded by a pretreatment section to activate the iron-tin alloy surface, for providing the strip with a second tin layer onto at least one side, optionally followed by one or more rinsing tanks for removing excess electrolyte;
optionally followed by a melting section for fluxing and flow melting the second tin layer;
followed by a second fast cooling section wherein the cooling rate after heating is at least 100° C./s;
optionally followed by a passivation section to apply a hexavalent-chromium-free passivation layer.

* * * * *